July 31, 1923.
C. F. CULLEN
GAME
Filed July 20, 1921
1,463,388
2 Sheets-Sheet 1
Fig. 1.
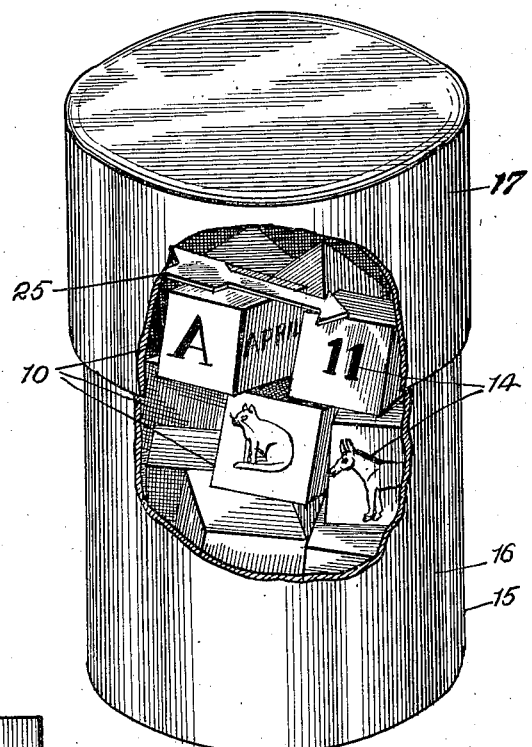
Fig. 2.
Fig. 5.
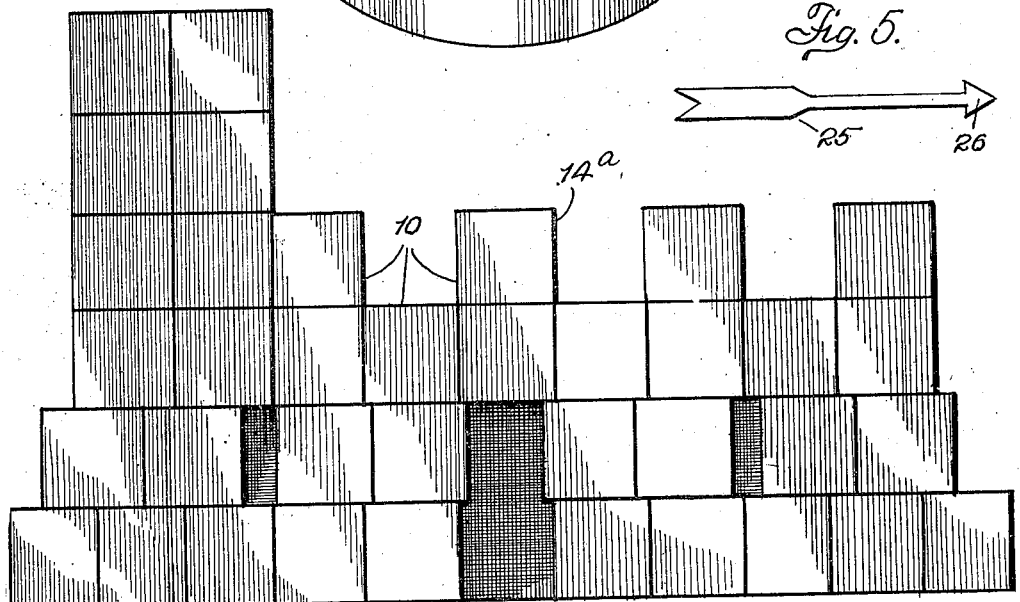
INVENTOR
Catherine F. Cullen
BY
W. T. Criswell.
ATTORNEY July 31, 1923.
C. F. CULLEN
GAME
Filed July 20, 1921  2 Sheets-Sheet 2
1,463,388
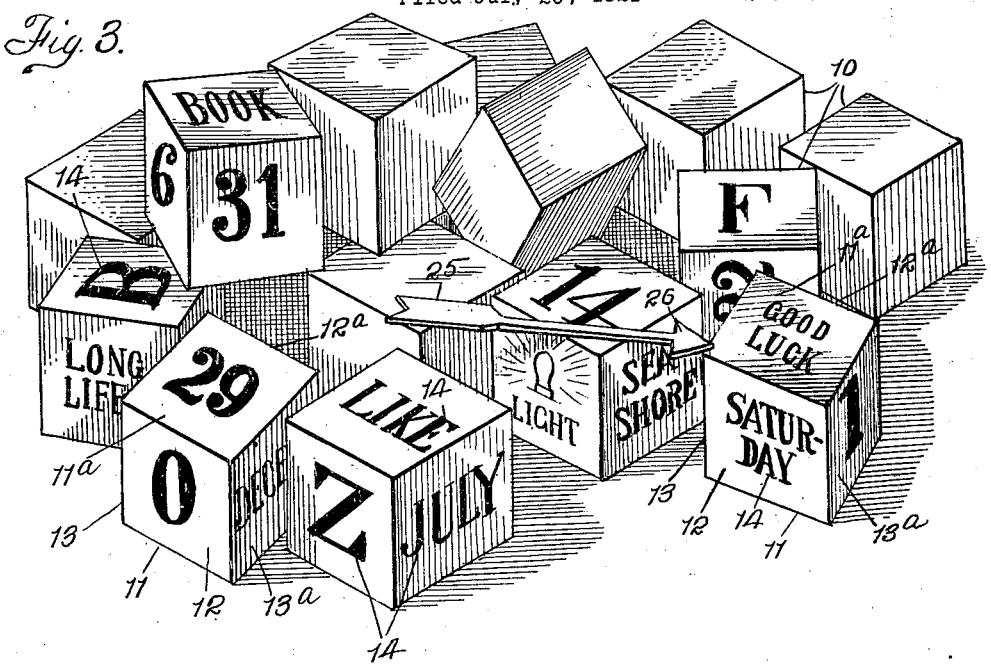
INVENTOR
Catherine F. Cullen
BY
W. T. Criswell
ATTORNEY Patented July 31, 1923.

1,463,388

UNITED STATES PATENT OFFICE.

CATHERINE F. CULLEN, OF NEW YORK, N. Y.

GAME.

Application filed July 20, 1921. Serial No. 486,293.

*To all whom it may concern:*

Be it known that I, CATHERINE F. CULLEN, a citizen of the United States, and a resident of New York, in the county of New York and State of New York, have invented certain new and useful Improvements in a Game, of which the following is a full, clear, and exact specification.

This invention relates more particularly to a class of amusement devices.

My invention has for its object primarily to provide a device or game designed to be employed for entertaining persons in a fashion whereby their fortunes may be prophesied or a possible future event may be predicted in an amusing manner, and which is of a form so that a child may use the device while playing if desired. The invention consists essentially of a box or container, and a number of separate blocks of cubic or other angular shapes so that the blocks may be shuffled in the box after which they are distributed on a suitable surface. On each face of each block is provided indicia each different from the others of the block, and the indicia of each block may include an inscription, the picture of an object, a word, a letter of the alphabet or a numeral. The indicia of each block is also different from the indicia of the other blocks, and all of the indicia may be read to prophesy an event or represent a date or the act of a person so that selection of the blocks emptied from the box may be made and then arranged in consecutive rows to provide a fortune telling rebus.

Another object of the invention is to provide a separate indicator adapted to be shuffled in the box for being intermingled with the blocks when distributed to indicate the indicia of one of the blocks so that a possible happening may be foretold.

With these and other objects in view, the invention will be hereinafter more fully described with reference to the accompanying drawings forming a part of this specification in which similar characters of reference indicate corresponding parts in all the views, and will then be pointed out in the claims at the end of the description.

In the drawings, Figure 1 is a view, partly broken away, showing an elevation of one form of game embodying my invention.

Fig. 2 is a view showing a form of structure which may be built by a child when playing with the blocks of the game.

Fig. 3 is an enlarged perspective view showing the blocks and indicator of the game when distributed on a surface.

Fig. 4 is an enlarged plan of a fortune telling rebus formed by arranging a number of the blocks in rows, and Fig. 5 is a plan of the indicator which may be used in the game.

The device or game has a plurality of blocks, as 10, which may be of any suitable angular shapes, though the blocks illustrated are cubic in forms so that each block has six faces, as 11, 11ª, 12, 12ª, 13, 13ª. On each face of each block is provided indicia 14, such as an inscription which may be read so as to foretell a possible event or happening, or a picture of an animal or other object significant of the event, or a letter of the alphabet to indicate the name of a person or place, or a number which may be read to forecast a date. The blocks may be of any desired size as well as being made of any suitable material, and the indicia may be inscribed, painted, impressed or otherwise provided on the blocks so that they may be serviceable and attractive or plain in design. Moreover, the blocks may be of sizes to permit of being played with by children in the manner of building various structures 14ª as indicated in Fig. 2, and the indicia on the blocks will in turn provide instructive subject matter for them.

A box or container, as 15, is provided for use to enable the blocks to be shuffled therein as well as permit the blocks when not used to be safely kept. I prefer to provide a large number of the blocks 10, instead of a limited number as the fortune telling features of the game so that the game may be of a diversified character. The box is made with a body 16 preferably of a size so that all of the blocks may be thoroughly intermingled when shuffled in the box, and the open top of the body may be opened and closed by a removable cover, as 17.

To play one form of the game the blocks are shuffled in the box, and following the removal of the cover 17 the blocks are distributed on a table or other surface. A number of the blocks are then selected at random, for example, twenty-eight of them may be chosen, and these blocks are then arranged so that seven rows, as 18, 19, 20, 21, 22, 23, 24, of four blocks each are formed to provide a fortune telling rebus, Fig. 4. The rebus may be variously read or translated according to an established rule or key, or according to any original conception of the indicia 14 on the exposed faces of the blocks. To illustrate one reading of the rebus the fortune telling indicia 14 may be read by translating the indicia of the consecutive rows of blocks as follows:—

Row No. 18 may be translated as, To the house. You will have trouble with tears between the 22nd and 29th of next month, and a person with Z in his or her name will be the cause.

Row No. 19 may be translated as, To yourself. You will obtain light from this person which will bring you good luck on or about Tuesday nearest the 6th of the month.

Row No. 20 may be translated as, To your wish. A dark man is going to endeavor to upset your plans. You may recognize him by the letter P.

Row No. 21 may be translated as, To his or her wish. You will shake hands with a millionaire having the letters A, D in his name.

Row No. 22 may be translated as, What you do expect. From the 11th to the 20th of next February you will be visited by a soldier.

Row No. 23 may be translated as, What you do not expect. A boy will cause you worriment between the 2nd and 24th of an early month.

Row No. 24 may be translated as, What is sure to come true. A school friend having an initial N in his or her name will give you an animal which will bring harmony between you and a supposed enemy.

In conjunction with the blocks I may also employ an indicator, as 25, whereby the game may be employed for making prophecies. This indicator is preferably in the form of a pointer on one end of which may be a dart shaped head 26, and this pointer is of a size to allow of being shuffled in the box with the blocks so as to be intermingled with the blocks when distributed on the surface. The indicia 14 on one of the blocks to which the pointer then points may be translated accordingly to prophesy an event, an object, a date or a locality. Thus I provide a simple and efficient game for telling fortunes of persons in a very interesting and entertaining manner.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A game apparatus, comprising a box, a plurality of separate angular blocks adapted to be shuffled in the box and subsequently distributed therefrom upon a surface, each block having on each of its faces different indicia which may include an inscription, the picture of an object, a word, a letter of the alphabet or a numeral, all indicative of an event or person or date and the indicia of each block being different from the indicia of the other blocks, and a separate indicator adapted to be shuffled in the box with the blocks for being intermingled with the blocks when emptied from the box on a surface whereby one of the blocks will be designated for selection.

2. A game apparatus comprising a box having a removable cover, a plurality of separate cubes adapted to be shuffled in the box and subsequently distributed therefrom upon a surface, each cube having on each of its faces different indicia which may include an inscription, the picture of an object, a word, a letter of the alphabet or a numeral all indicative of an event or person or date and the indicia of each cube being different from the indicia of the other cubes, and a separate pointer adapted to be shuffled in the box with the cubes for being intermingled with the blocks when emptied from the box on a surface whereby one of the blocks will be designated for selection.

3. A game apparatus comprising a box having a removable cover, separate elements adapted to be shuffled in the box and subsequently distributed therefrom upon a surface, each element having different indicia which may include an inscription, the picture of an object, a word, a letter of the alphabet or a numeral all indicative of an event or person or date so that selections of the elements on the surface may be made and then arranged in consecutive rows to provide a fortune telling rebus, and a separate pointer adapted to be shuffled in the box with the blocks for being intermingled with the blocks when emptied from the box on a surface whereby one of the blocks will be designated for selection.

This specification signed and witnessed this 19th day of July A. D. 1921.

CATHERINE F. CULLEN.

Witness:
J. FREDERICK CRYER.